United States Patent [19]
Wong et al.

[11] Patent Number: 5,923,577
[45] Date of Patent: Jul. 13, 1999

[54] METHOD AND APPARATUS FOR GENERATING AN INITIAL ESTIMATE FOR A FLOATING POINT RECIPROCAL

[75] Inventors: Roney S. Wong, Sunnyvale; Hei T. Fung, Campbell, both of Calif.

[73] Assignee: Samsung Electronics Company, Ltd., Seoul, Rep. of Korea

[21] Appl. No.: 08/729,661

[22] Filed: Oct. 21, 1996

[51] Int. Cl.$^6$ ............................................. G06F 7/38
[52] U.S. Cl. ............................................. 364/748.08
[58] Field of Search ................ 364/748.01, 748.08, 364/748.1, 761, 765, 752, 753

[56] References Cited

U.S. PATENT DOCUMENTS

| | | | |
|---|---|---|---|
| 3,648,038 | 3/1972 | Sierra | 364/765 |
| 3,777,132 | 12/1973 | Bennett, Jr. | 364/765 |
| 5,065,352 | 11/1991 | Nakano | 364/765 |
| 5,153,851 | 10/1992 | Kanazawa et al. | 364/765 |

*Primary Examiner*—Chuong D. Ngo
*Attorney, Agent, or Firm*—Skjerven, Morrill, MacPherson, Franklin & Friel

[57] ABSTRACT

An initial estimate of a reciprocal of a floating point number is generated in one addition having correct sign, exponent and up to five or more bits of precision in the fraction by subtracting the input floating point number from a constant. The constant is determined such that subtracting the floating point number from the constant results in bit complementing the most significant m bits ($f_0 \ldots f_m$), $1 \leq m \leq n$, of the fractional part of the floating point number to provide $1.\overline{f_0} \ldots \overline{f_m}$, negating the exponent E and subtracting 1, to provide an initial estimate of the exponent=−E−1, and including in the constant a correction factor to further improve the initial estimate.

34 Claims, 7 Drawing Sheets

METHOD AND APPARATUS FOR GENERATING AN INITIAL ESTIMATE FOR A FLOATING POINT RECIPROCAL

BACKGROUND OF THE INVENTION

1. Field of the Invention

The present invention relates to computer arithmetic and more particularly to determination of an initial estimate for a reciprocal of a floating point number.

2. Description of the Related Art

Digital signal processing typically requires determination of floating point reciprocals and digital signal processors frequently include a reciprocal as part of their instruction set. Numerous applications, such as three dimensional graphics processing, require high performance division. Algorithms such as the Newton-Raphson algorithm, which is a well known iterative approach to solving equations, can provide good performance as the accuracy of each succeeding iteration approximately doubles. Such algorithms, however, require an initial guess or estimate. The better the initial guess, the faster the Newton-Raphson algorithm (or other iterative approaches) will converge on the correct solution.

Prior art signal processors, such as the TI TMS320C4X and the Motorola DSP96002, use a table look up approach to determine the initial estimate for a reciprocal calculation. In such approaches a ROM stores the values of the estimates and is accessed for every estimate. However, in processors performing multiple floating point operations simultaneously, parallel reciprocal operations would require accessing multiple look up tables. Such a solution would be costly because it would require additional space on silicon for each additional look-up table ROM. Alternatively, one floating point operation could wait on another to complete accessing a single look-up table, an approach having obvious disadvantages. Further, even in processors requiring only one lookup table, it would be advantageous to eliminate the look up table ROM both to save space required for the ROM and to reduce the time for instruction execution by eliminating the need to access the look up table for each initial reciprocal estimate.

SUMMARY OF THE INVENTION

Accordingly, it is been discovered to provide a subtraction circuit to generate an initial estimate for a reciprocal of a floating point number and a method of operating that circuit, in which the floating point number and a predetermined second number are provided to the subtraction circuit. The floating point number is subtracted from the second number to provide a result which is used as the initial estimate. The approach of the invention disclosed herein provides the advantage of determining the initial estimate without using a lookup table. It is also provides the capability of generating an initial estimate within one instruction cycle. Additionally, the invention provides an initial estimate for a reciprocal of a floating point number that has the correct sign, exponent and up to five or more bits of precision in the fraction. In one preferred embodiment, the method determines an initial estimate for a reciprocal of a floating point number $x_0$, of a floating point unit of a processor. The floating point number has a fractional part, f, a sign and an exponent E, the floating point number being in the form of $1.f_0f_1f_2 \ldots f_n \times 2^E$, where $f_i = 0$ or 1. The method includes bit complementing the most significant m bits ($f_0 \ldots f_m$), $1 \leq m \leq n$, of the fraction of the floating point number to provide $\overline{f_0} \ldots \overline{f_m}$. A correction factor h, is subtracted to provide that the fractional part equals 1. $\overline{f_0} \ldots \overline{f_m}$ minus the correction factor. The exponent E is negated and 1 is subtracted from it, to provide the initial estimate with the initial estimate exponent having a value of $-E-1$. The method can provide the initial estimate as $(1.\overline{f_0}\overline{f_1}\overline{f_2} \ldots \overline{f_m} - h) \times 2^{-E-1}$ in a single execution cycle.

These and other aspects of the invention can be best understood with reference to the accompanying drawings and the detailed description of the invention.

BRIEF DESCRIPTION OF THE DRAWINGS

In the drawings, where like numbers represent like element.

DESCRIPTION OF THE PREFERRED EMBODIMENT(S)

Figure 1:
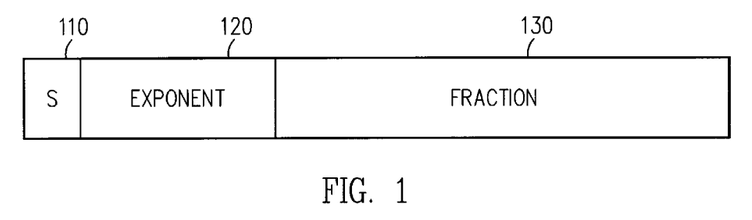
FIG. 1 depicts a floating point number in IEEE 754 format.

Referring to FIG. 1, a floating point number, $x_0$, is shown in IEEE 754 format. The floating point number, $x_0$, is the form of $x_0 = (-1)^S \times 1.f \times 2^E$ (where $f = f_0 f_1 f_2, \ldots f_n$, and where S is a sign bit). That is, the floating point number includes a sign, a significand (1.f) and an exponent (E). As shown in FIG. 1, the representation of the floating point number $x_0$ includes sign bit 110, exponent field 120 and fraction field 130. For IEEE 754 single precision format, the sign is one bit, the exponent is eight bits and the fraction is twenty three bits. Note that the IEEE format includes a hidden 1 such that the significand always includes 1+the fraction although the one is not represented. The floating point numbers discussed herein are assumed to be in IEEE 754 single precision format. However, the teachings contained herein are applicable to the other precessions specified in the IEEE standard (e.g., single extended, double, double extended). Additionally, the invention disclosed herein can be modified to accommodate other floating point representations.

The reciprocal of a number $x_0$, where $x_0 = \pm 1.f_0,f_1, \ldots f_n \times 2^E$, is $$\pm \frac{1}{1 \cdot f_0 f_1 \ldots f_n \times 2^E},$$

with the reciprocal having the same sign as $x_0$. An initial guess for the reciprocal requires a guess for the sign, the significand and the exponent. The exponent of the reciprocal of $x_0$ will be approximately the negative of the input exponent, i.e., the exponent of the reciprocal will equal approximately $-E$. The exponent of the reciprocal is not equal to $-E$ because $$\frac{1}{1 \cdot f_0 f_1 \ldots f_n \times 2^E}$$

results in a division of '1' by a number between '1' and '2'. This results in the value of the exponent of the reciprocal being one less than $-E$, i.e., $-E-1$, if the result is normalized, as required in IEEE 754.

However, it is still necessary to determine an initial estimate for the fractional part of the reciprocal.

TABLE 1

| Reciprocal $\frac{1}{1.f}$ | Actual Value of Reciprocal | Two MSBs of f | Bit complement of two MSBs of f | Estimate with hidden 1 | Normalized Actual Values of Reciprocal |
|---|---|---|---|---|---|
| $\frac{1}{1.01}$ | 0.1100 | 01 | 10 | 1.10 | 1.10 |
| $\frac{1}{1.10}$ | 0.1010 | 10 | 01 | 1.01 | 1.01 |
| $\frac{1}{1.11}$ | 0.1001 | 11 | 00 | 1.00 | 1.00 |
| $\frac{1}{1.00}$ | 1.0000 | 00 | 11 | 1.11 | 1.00 |

Table 1 illustrates a way to quickly determine the appropriate value to set the fraction of the initial estimate. The first column contains the reciprocal, $$\frac{1}{1.f},$$

for which is sought an initial estimate. For simplification, the exponent is not shown in Table 1. The second column contains the actual value of the reciprocal to four fractional places as shown in the actual value column. The third through fifth columns show respectively, the two most significant bits (MSBs) of f, the bit complemented value of the two MSBs which forms the basis for the estimate, and the estimate when the hidden one is included. The normalized actual value of the reciprocal is shown in the final column.

As can be seen from the first through third rows of Table 1, the estimated value agrees with the actual value for the first two bits of the fraction. Note that because of the normalization of the actual value, the exponent has to be decremented by one. When the input number is 1.00 (reciprocal=1) (last row of Table 1), a slightly different case may seem to exist, but in fact, all four estimates can be viewed as having the same property. Namely, the estimate with the hidden 1, is always 2 times the actual value of the reciprocal. Thus, $0.1100 \times 2 = 1.10$; $0.1010 \times 2 = 1.01$; $0.1001 \times 2 = 1.00$; $1.000 \times 2 = 1.11$.

The bit complement can also be performed on more than just the two most significant bits (MSBs) of the fraction. For instance, if all 23 bits of the fraction are bit complemented for the estimate of the reciprocal of 1.0, the result is:

1.1111 . . . $1 \times 2^{-E-1}$, with an unnormalized value of 0.1111111 . . . 11, which is very close to the actual value of 1.0.

Thus, negating the exponent and bit complementing the fraction of the floating point number for which we desire a reciprocal, provides an estimate for the reciprocal.

The IEEE floating point standard contains an exponent bias of 127, such that the actual value of the exponent is $E_{bias} - 127$. The bias allows the eight bits of the exponent to represent values from $E_{min}$ of $-126$ to $E_{max}$ of 127 for single precision. To calculate the exponent of a reciprocal, consider that the exponent is biased by 127. The original value of the exponent needs to be unbiased, negated, and have the bias added back in to calculate the exponent of the reciprocal. The exponent of a reciprocal is thus $-(E_{bias} - \text{bias}) + \text{bias} = -(E_{bias} - 127) + 127 = 254 - E_{bias}$. Therefore, the initial guess for the exponent can be calculated by calculating $(254 - E_{bias})$. In hexadecimal notation, 254 is 'fe'.

As an example of estimating E, given the bias approach of the IEEE standard, consider the following. Assume an input number $x_0$ equals $1.01 \times 2^3 = 1.25_{10} \times 8 = 10$. This is represented as $1000\ 0010_2$ $(130_{10})$ in the exponent field, and $0.0100 \ldots 0_2$ in the fraction field. Subtracting $254_{10} - E_{bias}$ or $254_{10} - 130_{10} = 124_{10}$ or $0111\ 1100_2$. When the bias is considered, $E = -3 = (124 - 127)$, which equals $-E$.

It would be desirable to combine the subtraction required to determine the exponent value of the initial estimate with the bit complement performed on the fraction bits in order to avoid having to perform separate steps. Subtracting the fraction, $f_0, f_1 \ldots f_{22}$, from '7fffff' (111 1111 1111 1111 1111 1111), bit complements the fraction. The subtraction results in:

$$\begin{array}{r} 111\,1111\,1111\,1111\,1111\,1111 \\ -f_0 f_1 f_2 \ldots f_{21} f_{22} \\ \hline \overline{f_0} \overline{f_1} \overline{f_2} \ldots \overline{f_{21}} \overline{f_{22}} \end{array}$$

Subtraction of the floating point number from 7fffff as a way to bit complement has an important effect. Subtracting a number is equivalent to bit complementing the number and adding '1'. Adding '1' to '7fffff' results in a carry out of the most significant bit (MSB) of the fraction into the exponent, while the fractional value is a bit complement of the input ($\overline{f_0} \overline{f_1} \overline{f_2}, \ldots \overline{f_{21}} \overline{f_{22}}$). The combination of the subtraction of $(254 - E_{bias})$ and ('7fffff' $-f_0 f_1 \ldots f_{22}$), where '7fffff' is a hexadecimal number and $f_0 f_1 \ldots f_{22}$ is the input fraction, results in:

$$\frac{111\ldots0\,111\,1111\ldots11}{-e_0e_1e_2\ldots e_7\,f_0f_1f_2\ldots f_{21}f_{22}}$$
$$254-E_{bias}\,\overline{f_0f_1f_2\ldots f_{21}f_{22}}$$

Numerically, this is $1.\overline{f_0f_1f_2}\ldots\overline{f_{21}f_{22}}\times 2^{-E}$.

Subtracting $254-E_{bias}$ provides the exponent estimate. This can be written as $254+\overline{E}_{bias}+1$. The carry out from the fraction previously discussed, provides the '+1'. However, the estimate of $-E$ still needs to be reduced by '1' to account for dividing '1' by a number larger than '1'. The appropriate addition is therefore $253+\overline{E}_{bias}$. Thus, the appropriate number to add to the exponent is 'fd' or 111 1101.

Combining '7fffff' with the modified exponent value of 253 or 'fd', results in a floating point number of '7eff ffff' (with the sign bit). Defining m as a floating point number and assuming an input floating point number $x_0$, for which is sought a reciprocal, the initial estimate is provided by $(m-x_0)$, where $m=$'7eff ffff'or m has a binary value of 0|111 11101|111 1111 1111 1111 1111 1111 1111, with the vertical bars delineating the sign bit, exponent and fraction, respectively.

Consider the following example:

Let $x_0=(2.5)_{10}=(10.1)_2=(1.01)_2\times 2^1$. In floating point representation of $x_0$.

$x_0=$0|100 0000 0|010 0000 0000 0000 0000 0000

In hexadecimal, the subtraction $(m-x_0)$ is ('7e7fffff'−'40200000')=(g) where (g) is the floating point value of the initial estimate or guess. In binary floating point representation, (g)=0|011 1110 1|101 1111 1111 1111 1111 1111, so $g=(1.1011\ldots 11)_2\times 2^{-2}=(1.11)_2\times 2^{-2}=(0.0111)=1\times 2^{-2}+1\times 2^{-3}+1\times 2^{-4}=0.4375_{10}$. When compared to the actual reciprocal, $1/2.5=0.4_{10}$, the estimate can be seen to be a good one.

Table 2 shows the range of operations in terms of the largest and smallest numbers, both negative and positive, for which this approach to providing estimates for reciprocals will work. Assume an initial guess (g), of a floating point reciprocal of $x_0$, to be (g)=m−$x_0$, where m is a 32 bit constant used to help determine the initial guess and $x_0$ is in IEEE format.

TABLE 2

| | |
|---|---|
| lower bound | $x_0$ = 00800000 or 1.175494 × 10$^{-38}$ (smallest NORM) |
| | $\frac{1}{x_0}$ = 7e800000 or 8.507059 × 10$^{37}$ (NORM) |
| | g = 7e7d413c or 8.415835 × 10$^{37}$ |
| upper bound | $x_0$ = 7e7d413c or 8.415835 × 10$^{37}$ |
| | $\frac{1}{x_0}$ = 00816331 or 1.18823 × 10$^{-38}$ |
| | g = 00800000 or 1.175494 × 10$^{-38}$ |
| | $x_0$ = 7e7d413d or 8.415835 × 10$^{37}$ |
| | $\frac{1}{x_0}$ = 00816331 or 1.188236 × 10$^{-38}$ |
| | g = 007fffff (DNORM) |

The range of operation for the estimation approach disclosed herein is between 0080000 to 7e7d413c and is closely related to m. At m=fraction of $x_0$, (m−$x_0$) generates the smallest normalized number. See, e.g., the middle example in Table 2. At m, fraction of $x_0$, m−$x_0$ generates a DNORM as can be seen in the last example in Table 2. The range of operations can be stated as any floating point number with an exponent value (including bias) above 252 will generate a DNORM with a zero exponent field. Prior art approaches using a table look up ROM have similar limitations. One solution is to scale down both the dividend and the divisor by equal amounts so that divisor has an exponent $\leq 252$.

Providing the reciprocal estimate requires that the sign of the input number be properly carried through to the estimate. The approach disclosed herein always generates the correct sign for the initial estimate (seed) of the reciprocal. If x is a positive number, then $$\frac{1}{x}$$

will always be a positive number. If x is a negative number, then $$\frac{1}{x}$$

will always be a negative number.

The estimation method uses an initial guess (g)=m−$x_0$. Consider only the upper 9 bits (sign bit and 8 exponent bits). As discussed, the exponent is in the range (with the bias) of 1 (smallest NORM) to $252_{10}$ or $11111100_2$ (largest NORM in IEEE 754 standard is 254; 255 is ∞ or NAN (not a number)). In Table 3, column 2 shows the input numbers $x_0$ and m, in the form of m−$x_0$. The guess is shown in the right hand column in the form of 2's complement addition. The sign of the guess (g) is shown as the left most bit in the right hand column and is indicated by an 's' underneath the bit. For the largest positive and largest negative numbers, the 1 in the LSB of the exponent results from a carry in from the fraction. As can be seen, the estimation method of the instant invention generates the correct sign.

TABLE 3

| | m − $x_0$ | Result of guess |
|---|---|---|
| smallest pos | 0111 1110 1<br>− 0000 0000 1 → | 0 111 1110 1<br>+ <u>1 111 1111 0</u><br>0 111 1110 0<br>s |
| smallest neg | 0111 1110 1<br>− 1000 0000 1 → | 0 111 1110 1<br>+ <u>0 111 1111 0</u><br>1 111 1110 0<br>s |
| largest pos | 0111 1110 1<br>− 0111 1110 0 → | 0 111 1110 11<br>+ <u>1 000 0001 11</u><br>0 000 0000 1<br>s |
| largest neg | 0111 1110 1<br>− 1111 1110 0 → | 0 111 1110 11<br>+ <u>0 000 0001 11</u><br>1 000 0000 1<br>s |

This approach described herein to quickly determine an estimate for a reciprocal of a floating point number by determining the guess (g)=m−$x_0$, where m is a predetermined constant, can alternatively be viewed as follows.

Let $x_0=1.f_0f_1\ldots f_{22}\times 2^E$. The guess $(g)=1.\overline{f_0f_1}\ldots\overline{f_{22}}\times 2^{-E-1}$. The guess $(g)\approx 1\times 2^{-E-1}+(1-0.f_0f_1\ldots f_{22})\times 2^{-E-1}$. This can be simplified by letting $f=(0.f_0f_1\ldots f_{22})$. Then $$g=(2-f)\times 2^{-E-1}=\left(1-\frac{f}{2}\right)\times 2^{-E}.$$

Therefore, the initial estimate is $$(g) = \left(1 - \frac{f}{2}\right) \times 2^{-E},$$

which is one minus one half of the fractional part times $2^{-E}$.

Figure 2:
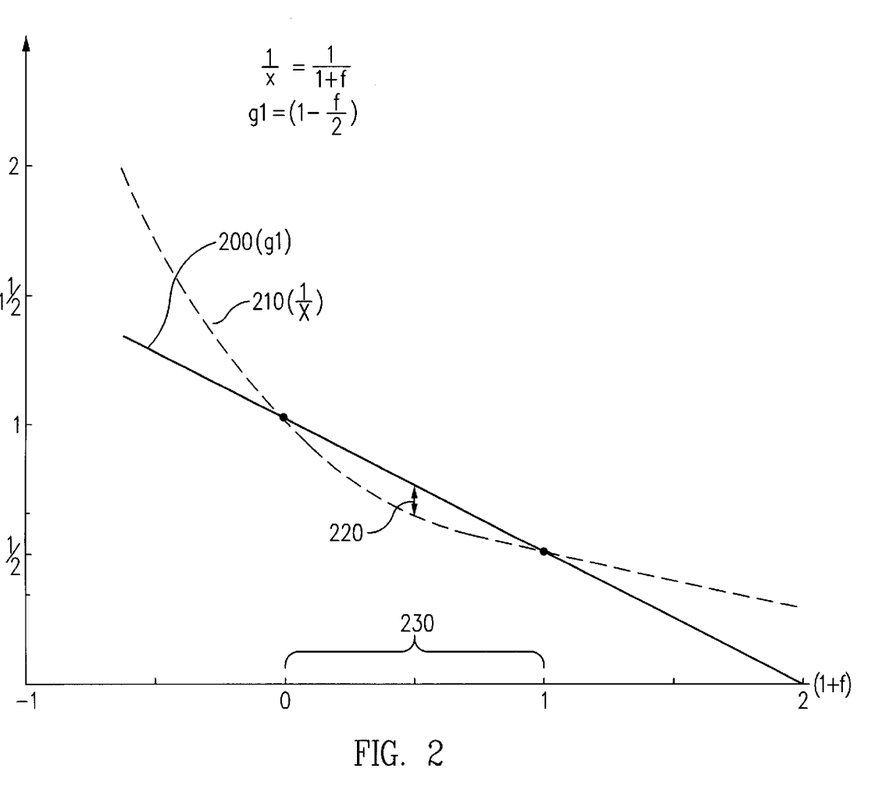
FIG. 2 graphically depicts the significand of the reciprocal and the initial estimate of the significand.

The initial guess can be shown graphically. Referring now to FIG. 2, the initial estimate 200, $$g_1 = \left(1 - \frac{f}{2}\right),$$

is a linear approximation of 210, the reciprocal of the actual significand which equals $$\frac{1}{1+f}.$$

The difference or error between curves 200 and 210 is shown as area 220 under curve 200. Note that the valid range, 230, of f is $0 \leq f < 1$.

In order to evaluate the accuracy of this approach and to see how this initial estimate can be further improved, consider an input floating point number $x_0$. The inverse of $$x_0 = \left(\frac{1}{1 \cdot f_0 f_1 \ldots f_{22}}\right) \times 2^{-E}.$$

By a Taylor series expansion, $$1/x_0 = (1 - f + f^2 - f^3 + \ldots) \times 2^{-E}$$

This Taylor series expansion of the reciprocal of $x_0$ can be compared with the guess (g) to evaluate the accuracy of the estimate. The difference, $\Delta$, is thus $$g - \frac{1}{x_0}, \text{ since } g \text{ is always} \geq \frac{1}{x_0}$$

as can be seen in FIG. 2. Therefore, $$\Delta = \left(\left(1 - \frac{f}{2}\right) \times 2^{-E}\right) - ((1 - f + f^2 - f^3 - f^4 + \ldots) \times 2^{-E})$$

$$= \left(1 - \frac{f}{2} - 1 + f - f^2 + f^3 - \ldots\right) \times 2^{-E}$$

$$= \left(\frac{f}{2} - f^2 + f^3 - f^4 + f^5 - \ldots\right) \times 2^{-E}$$

$$= \left(\frac{f}{2} - f^2(1-f) - f^4(1-f) - f^6(1-f) \ldots\right) \times 2^{-E}$$

The exponent part is treated separately, thus, $\Delta$ of the frac is:

$$\Delta_{frac} = \frac{f}{2} - f^2(1-f) - f^4(1-f) - f^6(1-f) \ldots$$

$$= \frac{f}{2} - f^2(1-f)(1 + f^2 + f^4 + \ldots)$$

$$= \frac{f}{2} - f^2(1-f)\left(\frac{1}{1-f^2}\right) \text{since } f < 1$$

$$= \frac{f}{2} - \frac{f^2(1-f)}{(1+f)(1-f)}$$

$$= \frac{f}{2} - \frac{f^2}{1+f}$$

Note that then $\Delta \geq 0$, for $0 \leq f < 1$.

Figure 5:
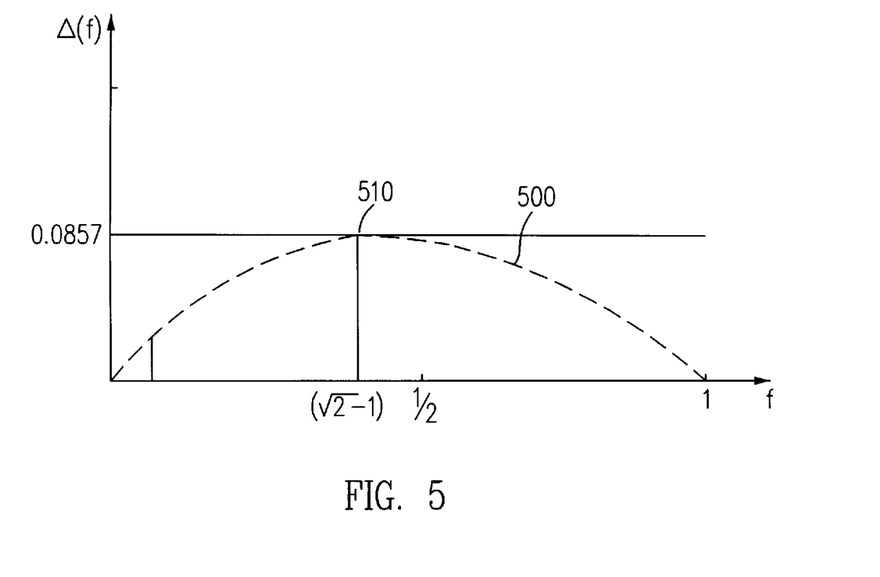
FIG. 5 graphs the error between the initial estimate and the significand of the reciprocal.

$\Delta$ is shown in FIG. 5 as curve 500. $\Delta_{max}$ occurs at 510 with a value of 0.0857.

Figure 3:
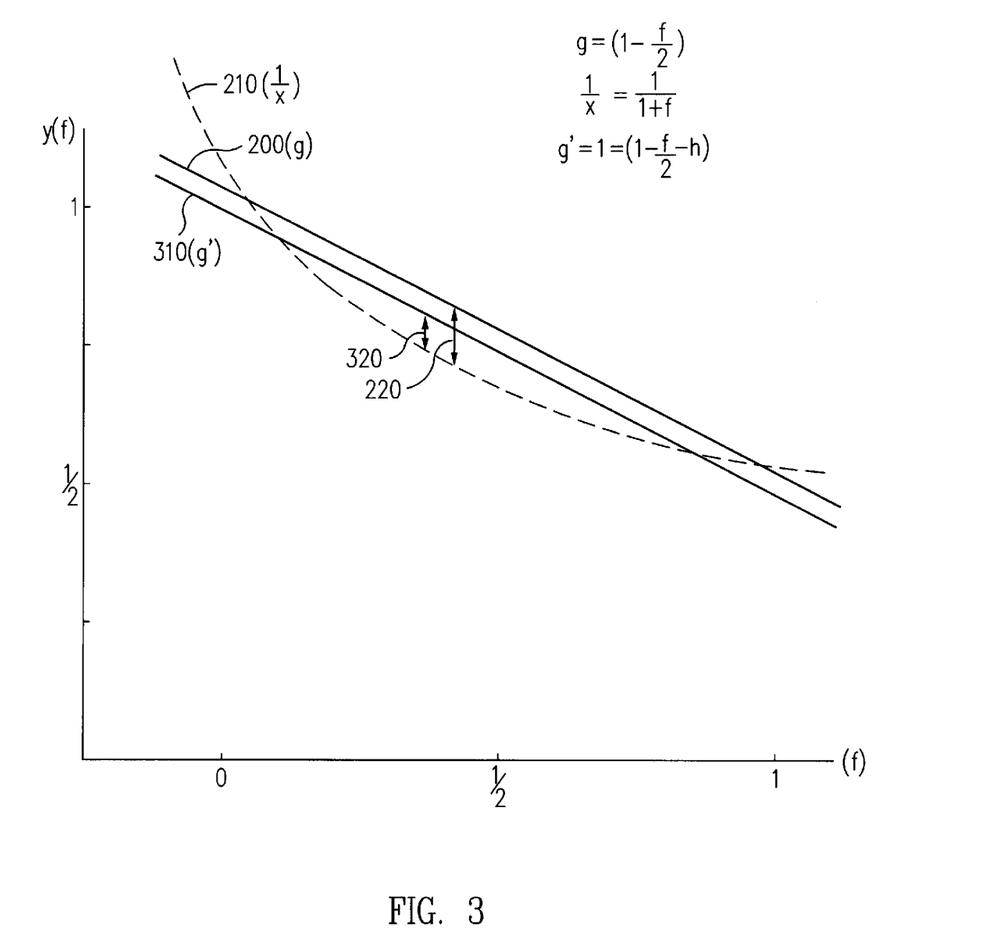
FIG. 3 graphically depicts the improved guess of the significand of the reciprocal.

Referring now to FIG. 3, the initial guess can be improved, i.e., can be made $\Delta$ smaller, by shifting down the initial guess down by some amount. This is shown as line 310 (g2) which equals $$1 - \frac{f}{2} - c$$

where c is a correction factor. That can also be expressed as $(1.\overline{f_0 f_1 f_2} \ldots \overline{f_m} - h)$, where h is also a correction factor. Because the former expression for the significand is multiplied by $2^{-E}$ whereas the latter is multiplied by $2^{-E-1}$, the relationship between c and h is that the correction factor c is equal to one half the correction factor h. More specifically, $c = h/2$, because, $$(1 \cdot \overline{f_0 f_1 f_2} \ldots \overline{f_m} - h) \times 2^{-E-1} = (2 - f - h) \times 2^{-E-1}$$

$$= (1 - f/2 - h/2) \times 2^{-E}$$

$$= (1 - f/2 - c) \times 2^{-E}$$

As can be seen in FIG. 3, shifting the linear approximation 200 down to 310, reduces the error 220 down to 320 around the point of the maximum error.

One way to determine an appropriate amount by which to shift the guess, g, is to evaluate the maximum value of the difference, $\Delta_{max}$. In order to determine the maximum difference, differentiate $$\frac{d\Delta}{df}.$$

$$\frac{d\Delta}{df} = \frac{1}{2} - \frac{(1+f)(2f) - f^2}{(1+f)^2} = \frac{1}{2} - \frac{2f + f^2}{(1+f)^2}$$

If $$\frac{d\Delta}{df} = 0,$$

then, $(1+f)^2 = 4f + 2f^2$ $1 + 2f + f^2 = 4f + 2f^2$ $0 = (f+1)^2 - 2$ $f + 1 = \pm\sqrt{2}$ $f = -1 \pm \sqrt{2}$ $f = -1 + \sqrt{2}$ (reject negative root because $0 \leq f < 1$)

$f = 0.41421356$

Therefore, $$\Delta_{max} = \frac{f}{2} - \frac{f^2}{(1+f)}\bigg|_{f=\sqrt{2}-1} = 0.20710678 - 0.12132034 = 0.08578644.$$

If the initial guess is $(g)=1.\overline{f_0 f_1} \ldots \overline{f_{22}} \times 2^{-E-1}$, the modified initial guess $(g')=(1.\overline{f_0 f_1} \ldots \overline{f_{22}} - (2(0.c_0 c_1 \ldots c_{22}))) \times 2^{-E-1}$, where c is an offset or a correction factor. The improved or modified guess, can also be written as $(g')=(1-f/2-c) \times 2^{-E}$, which is shown in FIG. 3 as linear approximation 310, the initial guess 200 shifted down by an offset.

The new difference $\Delta'$ is, $$\Delta'=f/2-f^2+f^3-\ldots-c,$$

$\Delta_{max}$ still occurs at $f=-1+\sqrt{2}$, since we differentiated in terms of f and c is a constant, and therefore $$\frac{d\Delta'}{df} = \frac{d\Delta}{df}.$$

However, $\Delta'_{max}=0.08578644-c$.

Figure 4:
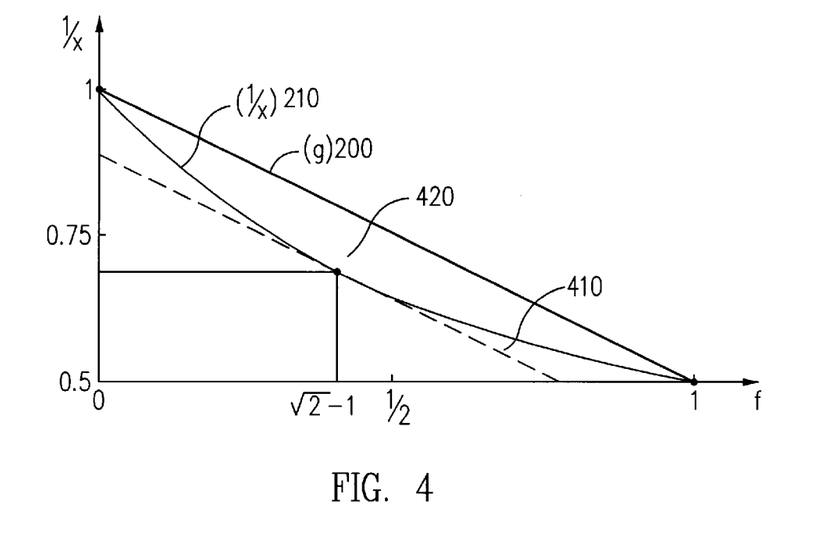
FIG. 4 shows an over-correcting guess of the significand of the reciprocal.

Referring now to FIG. 4, it can be seen that it would not be advantageous to set $c=0.08578644$, because this would overcorrect. If that correction was made, the resulting linear approximation 410 would be below curve 210

$$\left(\frac{1}{x}\right),$$

except at 420 which is where $f=-1+\sqrt{2}$. The offset is seen to increase the error at $f=0$ to a value of 0.08578644 and similarly, as f approaches 1, the error approaches 0.08578644.

It is a better correction to set $$c = \frac{0.0857844}{2} = 0.042893$$

Since $$\Delta = \frac{f}{2} - \frac{f^2}{(1+f)},$$

then $\Delta=0$ when $f=0$ or $f\approx 1$ (since f never equals 1).

$$\Delta' = \frac{f(1-f)}{2(1+f)} - c$$

If $\Delta'=0$, then, $f(1-f)=2c(1+f)$ $f^2+f(2c-1)+2c=0$,

The quadratic can be solved to determine a new zero crossing for $\Delta'$.

Figure 6:
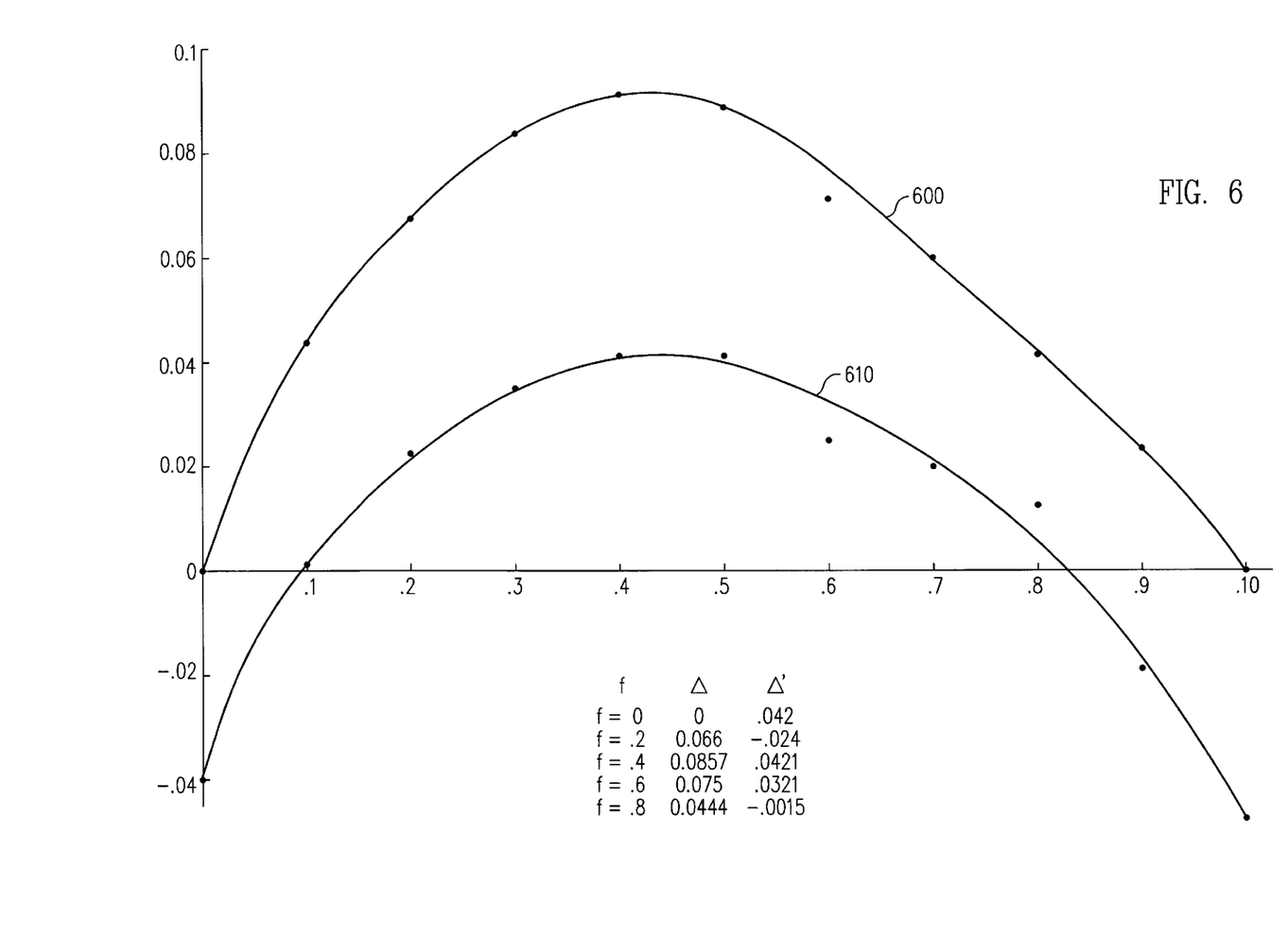
FIG. 6 depicts the errors of an initial estimate and an improved initial estimate.

FIG. 6 shows $\Delta$, 600, and $\Delta'$, 610. $\Delta'$ is shown for $c=0.042893$. The maximum error occurs at the same value, $f=\sqrt{2}-1$. Maximum error also occurs at the former zero crossing for $\Delta$ but the maximum error equals the correction factor, c, which is half the maximum error $\Delta$. Thus, maximum error is now evenly distributed at the three points $f=\sqrt{2}-1$, $f=0$, and when f is very close to 1 (as f approaches 1).

A result of decreasing the maximum error is to increase the precision of the initial estimate. The precision of the initial guess without the correction factor c can be evaluated as follows. The linear approximation, $$\left(1 - \frac{f}{2}\right), \text{ of } \frac{1}{1+f}, \text{ for } 0 \le f < 1,$$

has a maximum error of 0.08578644 at $f=-1+\sqrt{2}$. Simple arithmetic shows that the precision $$\frac{\text{max error}}{\text{value where max error occurs}} =$$

$$\frac{0.08578644}{1.41421356} = 0.060660 \text{ or } 0.000011\ldots_2.$$

Therefore, this initial estimate ensures four bits of precision in the fraction at the maximum error. With the correction factor, $$\left(\text{i.e. } \Delta'_{max} = \frac{\Delta_{max}}{2}\right),$$

the maximum error is halved, which is equivalent to a one bit shift to the right in binary representation. Therefore the precision increases by one bit. Specifically, the accuracy of the guess at the maximum error increases to $$\frac{0.0428932}{1.41421356} = 0.030330, \text{ or } 0.0000011_2.$$

Therefore, the initial guess with the correction factor is seen to have five bits of precision in the fraction at the value where the maximum error occurs.

Other methodologies can be used to analyze the error and improve the guess. For instance, relative error, rather than absolute error, can be analyzed. Defining relative error $\Delta_{relative}$, as $$\Delta_{relative} = \frac{\Delta_{abs}}{\text{actual reciprocal}} = \frac{\Delta_{abs}}{\frac{1}{1+f}} = \Delta_{abs}(1+f)$$

$$= \left(\frac{f}{2} - \frac{f^2}{1+f}\right)(1+f)$$

$$= \frac{(1+f)f}{2} - f^2$$

$$= \frac{f+f^2}{2} - f^2.$$

$$= \frac{f}{2} + \frac{f^2}{2} - f^2.$$

Therefore, $$\Delta_{relative} = \frac{f}{2} - \frac{f^2}{2}.$$

To solve for maximum $\Delta_{relative}$ (maximum relative error), set $$\frac{d\Delta}{df} = 0.$$

$$\frac{d\Delta}{d} = \frac{1}{2} - \frac{1}{2}(2f) = \frac{1}{2} - f.$$

Setting $\frac{d\Delta}{df} = 0$, $\frac{1}{2} - f = 0$ and $f = \frac{1}{2} = 0.5$.

Thus, maximum relative error, without correction occurs at 1+f=1.5. The maximum relative error at $$f = 0.5 \text{ is } \frac{0.5}{2} - \frac{0.5^2}{2} = 0.125 \text{ (3 bits of precision)}.$$

Figure 7:
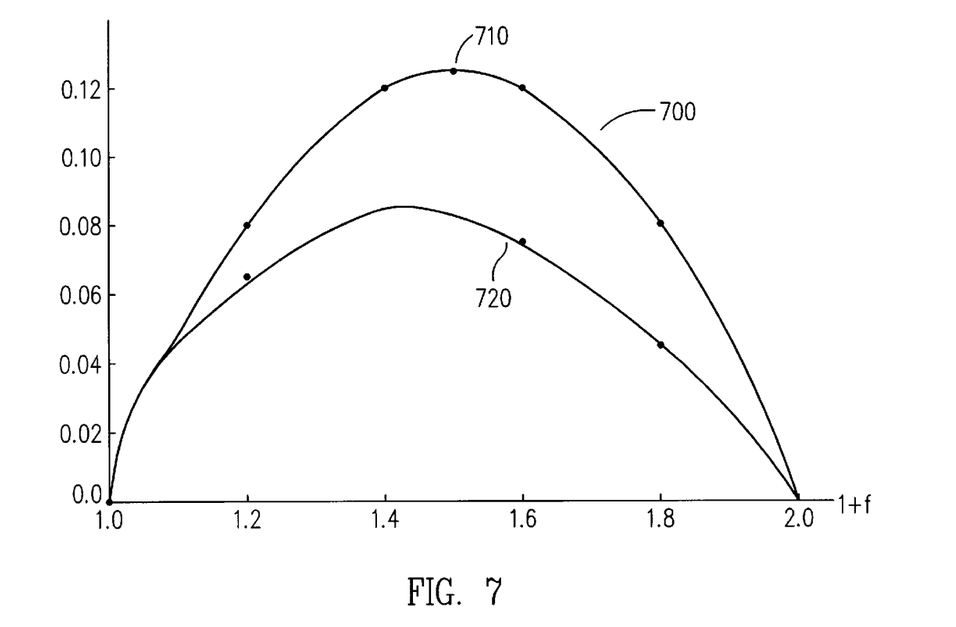
FIG. 7 shows relative and maximum error.

The curve for relative error is shown in FIG. 7. Curve 700 represents relative error graphed for values of 1+f. A maximum occurs at 710, where 1+f=1.5 and has a value of 0.125. Curve 720 represents the maximum absolute error.

The estimate for the reciprocal uses $$1 - \frac{f}{2} \text{ to predict } \frac{1}{1+f}.$$

Shifting the line $$1 - \frac{f}{2} \text{ by } \frac{\Delta_{abs}}{2},$$

minimizes absolute error by distributing it evenly at f=0, ($\sqrt{2}-1$) and 1. However, that shift causes relative error at f≈1 to have a maximum relative error of $\Delta_{abs}$ because $$\text{relative error} = \frac{\Delta_{abs}}{\frac{1}{1+f}} = \frac{\Delta_{abs}}{\frac{2}{0.5}} = \frac{\Delta_{abs}}{2} \times 2 = \Delta_{abs},$$

whereas before the shift relative error at f=1 is zero. Thus, it would be desirous to have a shift amount that minimizes relative error. The constraints are:

$$\text{max relative error} = \frac{0.85786438 - c}{2/3}$$

at f=0.5 and $$\text{max relative error} = \frac{c}{0.5}$$

at f≈1.0, which equals, 2c, where c is the shift.

The maximum relative error occurs at f=0.5 and f≈1.0, where for f=0.5, 1/(1+f)=1/1.5=2/3, and where for f≈1, 1/(1+f)≈1/2. Equating both errors and solving for c, $$\frac{0.085786438 - c}{2/3} = \frac{c}{1/2}$$

$$(3/2)(0.085786438 - c) = 2c,$$

$$c = (3/7) \times 0.085786438 = 0.0367656163.$$

The relative error is 0.0735312326 (which is four bit precision). Shifting down the estimate of $1 - \frac{f}{2}$ by $\frac{3}{7}(\Delta_{abs})$ reduces relative errors. However, this correction factor is not optimal.

Considering just the fraction, the prediction of the fraction of the initial guess $x_0$ can be broken down into 2 regions: First, where $x_{frac} < m_{frac}$ and second, where $x_{frac} \geq m_{frac}$ where $0 \leq x < 1$. Originally $m_{frac}=0$, since the estimate was $$1 - \frac{f}{2},$$

but after a shift to improve the estimate, $m_{frac} > 0$. For $x_{frac} \leq m_{frac}$, $g = (1.m - 0.x) \times 2^{-E-1}$.

$\left(\text{Originally, the estimation was } \left(1 - \frac{x}{2}\right) \times 2^{-E}\right)$.

For $x_{frac} \geq m_{frac}$, because of normalization requirements, $$g = (1 + (1.m - 0.x)) \times 2^{-E-2}$$

$$= (2 + 0.m - 0.x) \times 2^{-E-2}$$

$$= 1 + \frac{0.m - 0.x}{2} \times 2^{-E-1}.$$

Figure 9:
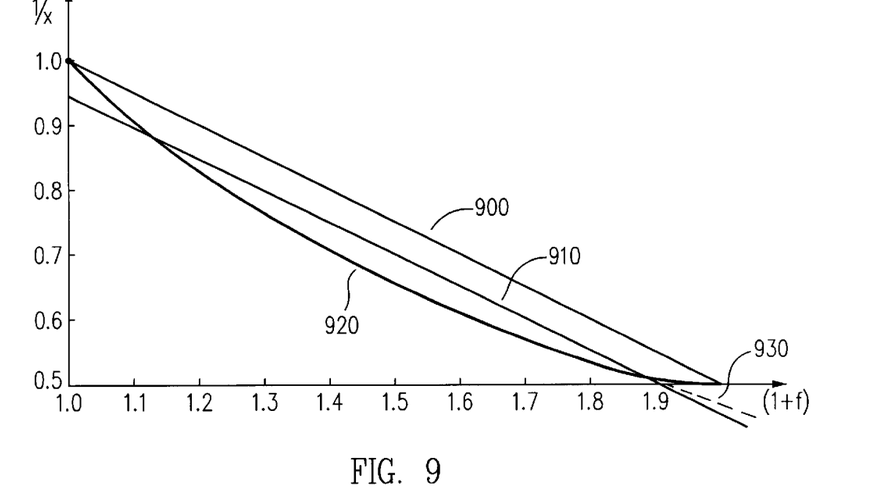
FIG. 9 graphs $x_{frac}$ v. $g_{frac}$.

Graphically, this is shown in FIG. 9. At $x_{frac}=m_{frac}$, the slope of the line changes is represented by the dotted line 930 below $g_{frac}=0.5$. The x-axis intercept of line 910 is $m_{frac}$. This can be seen because before the correction, the x intercept is f=1.0. At that point g=0.5. $m_{frac}$ is defined as g(1.mfrac)=0.5, i.e., the guess at 1.mfrac is 0.5.

At $x_{frac} = m_{frac}$ $$g = (1.m - 0.x) \times 2^{-E-1} = 1.0 \times 2^{-E-1}, \text{ and}$$

$$g = \left(1 + \frac{0.m - 0.x}{2}\right) \times 2^{-E-1} = 1.0 \times 2^{-E-1}.$$

Thus the line is continuous between $0.0 \leq x_{frac} < 1.0$. Intuitively, this means that between $0.0 < x_{frac} \leq m_{frac}$, the true value of $x_{frac}$ including the hidden 1 is $1.0 \leq x_{frac} \leq 1.m_{frac}$. The predicted reciprocal ranges from $$1.0\left(\frac{1.0}{1.0}\right) \text{ to } 0.5\left(\frac{1.0}{2.0}\right).$$

Between $m_{frac} \leq x_{frac} < 1.0$, the predicted reciprocal is always <0.5 which in binary representation, is one more shift to the right of the binary point, thus halving the error. If the error is halved, the accuracy is doubled. That is represented by the change in the slope. The maximum relative error thus occurs at $x_{frac}=0.5$ and $x_{frac}=m_{frac}$. The maximum relative error at $x_{frac}=0.5$ is $$\Delta_{abs}(1-k)/(2/3) = \frac{3}{2}\Delta_{abs}(1-k).$$

The maximum relative error at $x_{frac}=m_{frac}$ can be analyzed as follows. The method disclosed herein approximates $\frac{1}{x}$ using $1 - \frac{x-1}{2}$ or approximates $\frac{1}{1.f}$ using $1 - \frac{f}{2}$, where $0 \le f < 1$.

The maximum error in such approximation is abserr ($\Delta_{abs}$). To minimize errors (both maximum and relative), shift $$1 - \frac{f}{2}$$

down by an amount $(k)(\Delta_{abs})$ where k is a fraction. The estimated reciprocal is now $$1 - \frac{f}{2} - (k)(\Delta_{abs}).$$

At reciprocal $$= 0.5 \text{ or } \frac{1}{2},$$

$$\frac{1}{2} = 1 - \frac{x_{frac}}{2} - (k)(\Delta_{abs}).$$

Solving for $x_{frac}$ $$\frac{x_{frac}}{2} = 1 - (k)(\Delta_{abs}) - \frac{1}{2}$$

$$\frac{x_{frac}}{2} = \frac{1}{2} - (k)(\Delta_{abs})$$

$$x_{frac} = 1 - 2(k)(\Delta_{abs}).$$

At $x_{frac} = m_{frac}$, the predicted value is 0.5. $x_{frac}$ is $1.0 - 2(k)(\Delta_{abs})$ The actual value =

$$\frac{1}{1 + m_{frac}} = \frac{1}{1 + 1 - 2(k)(\Delta_{abs})} = \frac{1}{2 - 2(k)(\Delta_{abs})}.$$

The maximum relative error $= \frac{1/(2-2)(k)(\Delta_{abs}) - 1/2}{1/(2-2(k)(\Delta_{abs})}$ $$= 2 - 2(k)(\Delta_{abs})\left(\frac{1}{2 - 2(k)(\Delta_{abs})} - \frac{1}{2}\right).$$

The maximum relative error $= 1 - \frac{1}{2}(2 - 2(k)(\Delta_{abs}))$ $$= 1 - 1 + (k)(\Delta_{abs})$$

$$= (k)(\Delta_{abs}).$$

-continued

Equating both maximum relative errors results in, $$\frac{3}{2}\Delta_{abs}(1-k) = (k)(\Delta_{abs})$$

$$\frac{3}{2}(1-k) = k$$

$$\frac{3}{2} - \frac{3}{2}k = k$$

$$k + \frac{3}{2}k = \frac{3}{2}$$

$$\frac{5}{2}k = \frac{3}{2}$$

$$k = \frac{3}{2} \times \frac{2}{5} = \frac{3}{5} = 0.6.$$

This indicates to shift the curve down by $0.6 \times 0.08578644 = 0.0514718628$.

Therefore, instead of using $$1 - \frac{f}{2}$$

to predict reciprocal, use $$(1 - 0.051472) - \frac{f}{2} \text{ or } 0.948528137 - \frac{f}{2},$$

to improve the guess.

Table 4 indicates various correction factors that can be utilized according to the teachings of the instant invention. The table indicates the values that the correction factor c may be set to as a percentage of the maximum absolute error of 0.085786. The second column indicates the value after multiplying the appropriate percentage, k, times the maximum absolute error. The third column indicates $(1-k\Delta_{abs})$ and the final column shows the hex values of the fractional part of m'. Note that the use of ⅗ provides the best estimate.

TABLE 4

| k | | $k\Delta_{abs}$ | $1 - (k\Delta_{abs})$ | hex values |
|---|---|---|---|---|
| ½ | (0.5) | 0.042893 | 0.957107 | 7504f3 |
| 3/7 | (0.43) | 0.036766 | 0.963234 | 769687 |
| 4/7 | (0.57) | 0.049021 | 0.950979 | 73735f |
| 33/56 | (0.59) | 0.050553 | 0.949447 | 730efa |
| ⅗ | (0.6) | 0.051472 | 0.948528 | 72d2bd |

In order to provide the improved estimate in one cycle, rather than going through a process that requires separate steps, (i.e., negating the exponent; determining $\overline{f_0f_1f_2} \ldots \overline{f_{21}f_{22}}$, and offsetting this estimate by the correction factor), all operations can be combined into a single step. This is accomplished by combining the number (m) used both to negate the exponent and determine $\overline{f_0f_1f_2} \ldots \overline{f_{21}f_{22}}$, with the correction factor into a single constant . Thus, a new constant m' is determined, where m'=m−h, where m='7effffff' and, e.g., 2c or h=$\Delta_{abs}$=0.08578644. Thus, for this example, m'=7ef504f3, where a correction factor of h=0.08578644 is used (i.e. k=½).

Figure 8:
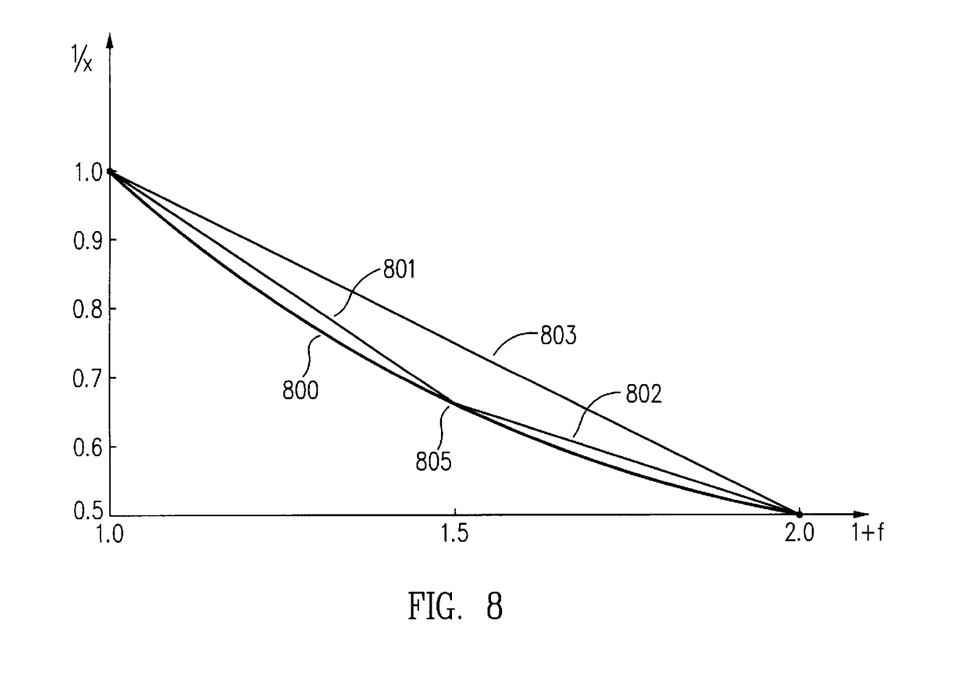
FIG. 8 shows piece-wise approximation of the reciprocal.

Other approaches can be used to obtain an estimate. Using piece-wise linear estimation can significantly reduce the error of the estimate. As shown in FIG. 8, the transition from a first linear estimate to a second linear estimate occurs at data point 805, where f=0.5, which in binary format is the bit after the binary point. Data point 805 is chosen as the end point of two lines 801 and 802 which are used to approximate curve 800. The lines 801 and 802 can be seen to be a better estimate than 803 which is $$1 - \frac{f}{2}.$$

The absolute error is reduced significantly.
Line segment 801 is $$0 \leq f < 0.5$$

$$y = 1 - \frac{2}{3}f.$$

Line segment 802 is $$0.5 \leq f < 1.0$$

$$y = \frac{5}{6} - \frac{1}{3}f.$$

However, it is difficult to derive $$\frac{1}{3} \text{ and } \frac{2}{3}$$

in binary format.

Figure 10:
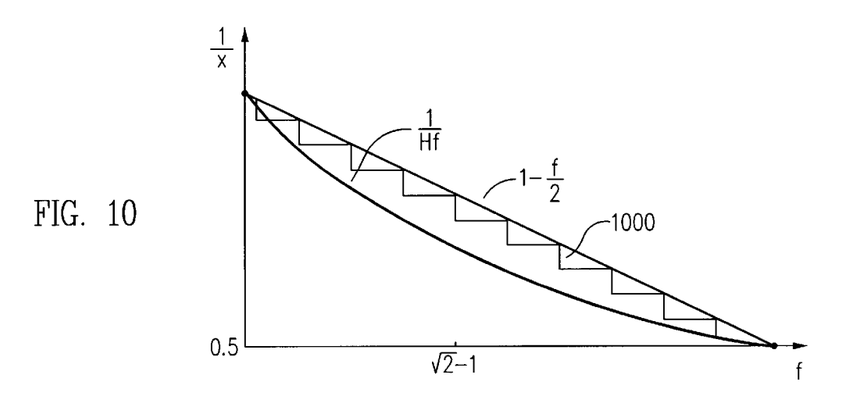
FIG. 10 shows a staircase approximation for the significand of the reciprocal.
Figure 11:
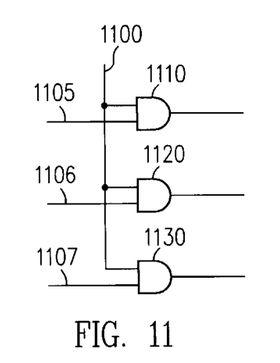
FIG. 11 shows a mask circuit to create the staircase approximation.

Still, other approaches can be utilized to estimate the curve $$\frac{1}{1+f}$$

using the teachings of the instant invention. For instance, instead of a straight linear approximation, $$1 - \frac{f}{2},$$

a staircase 1000 as shown in FIG. 10 can be utilized. Such a staircase can be implemented by ANDing a predetermined number of the least significant bits (LSBs) of the fraction, e.g., 3 bits, with '000'. Although this would seem to require one additional step because the ANDing can not be incorporated into m−$x_0$, the extra mask step can readily be implemented in a mask circuit that incurs only minimal gate delays before or after m−$x_0$ is determined. For example, three AND gates 1110, 1120, and 1130 provided with the three LSBs of the initial estimate, 1105, 1106 and 1107, and a control input 1100 as shown in FIG. 11, can provide a staircase for the guess of the reciprocal. The mask circuit would enable masking only on the output of the initial estimate from the adder. Of course, many hardware implementations to implement the masking, optimized for the specific processor environment, are possible. For example, the LSBs of f can be ORed with 1 before the adder. Thus, implementations would be known to one of ordinary skill in the art given the teachings of the present invention.

Figure 12:
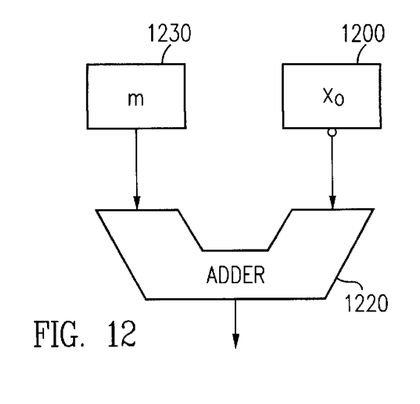
FIG. 12 shows an adder circuit configured to generate an initial estimate for the reciprocal of a floating point number.

Thus, a processor can use a very simple hardware structure shown in FIG. 12 to implement the one cycle estimation for a reciprocal of a floating point number. The floating point number $x_0$ is stored in register 1200 and is to be supplied to adder 1220. The adder of course, can negate the input from 1200 and have a carry in set to 1, in order to perform a subtraction. The number m (or m') is stored as a constant in register 1230. Register 1230 could be implemented as a writable register if there was a desire to fine tune the constant to achieve varying bits of precision for various applications, e.g., m in some applications, m' in others. This hardware structure estimates the reciprocal of $x_0$ in the amount of time it takes to subtract $x_0$ from the constant stored in register 1230. Software implementations of the invention disclosed herein are also contemplated, where, e.g., the constant is provided by or generated by the software prior to a subtract instruction in which the initial estimate is determined. Such a software approach, may of course, take more than one execution cycle.

Figure 13:
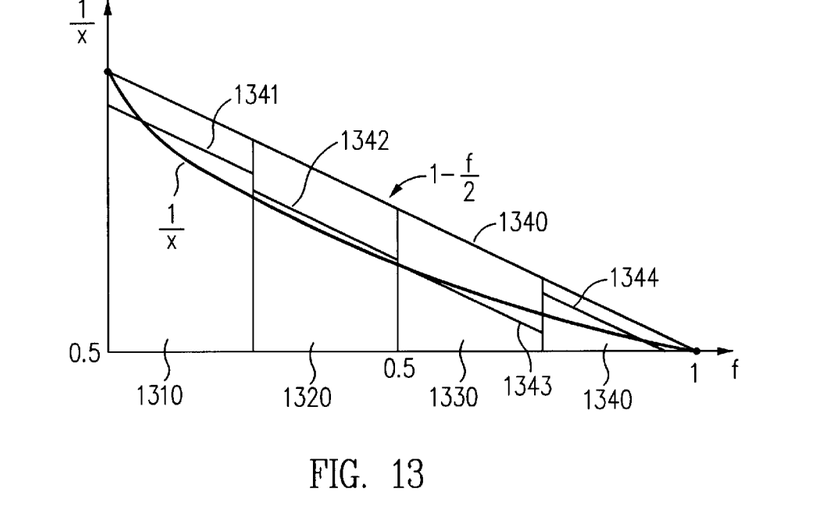
FIG. 13 shows graphically another approximation approach for the reciprocal of a floating point number.

Another approach to estimating the fraction of the reciprocal is shown in FIG. 13. The region of the fraction f, can be partioned into, e.g., four regions, 1310, 1320, 1330 and 1340. Then a different linear appoximation is used for each region. Each line segment 1341, 1342, 1343, 1344 may represent a line segment parallel to line segment 1340. The particular linear approximation to use, i.e., the value of the constant from which the significand is subtracted, is determined according to the value of the fractions bits. For example, if the region is divided into the four as shown, the two most significant bits of the fraction can be used to select the appropriate constant from which the significand is subtracted.

Figure 14:
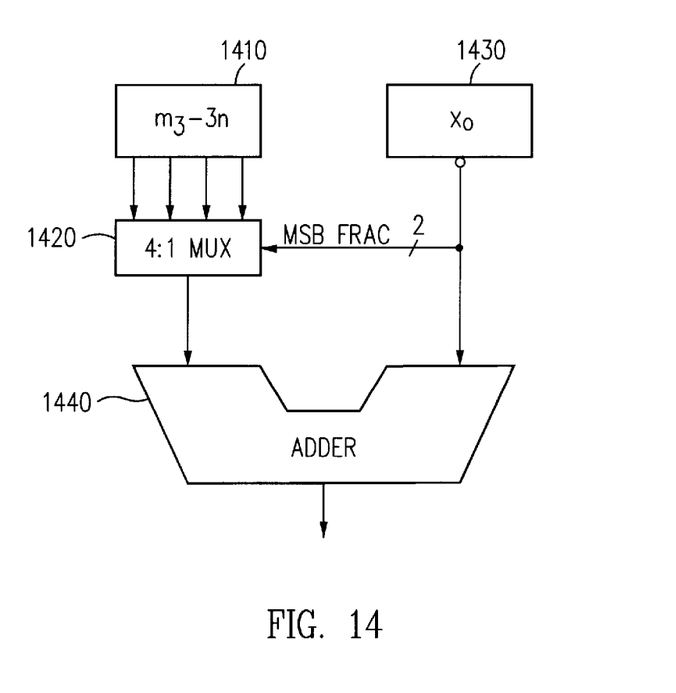
FIG. 14 shows an adder circuit configured to generate an initial estimate for according to the estimation approach shown in FIG. 13.

A hardware implementation of this embodiment is shown in FIG. 14. Four numbers ($m_3$–$m_0$) are stored in registers 1410. A four to one multiplexer 1420 is controlled by the most significant two bits of the fraction. Thus, as x comes into the adder, the appropriate m is selected from registers 1410.

The description of the invention set forth herein is illustrative, and is not intended to limit the scope of the invention as set forth in the following claims. For instance, the invention is applicable to other floating point representations and to the various floating point formats allowable under IEEE 754. Variations and modifications of the embodiments disclosed herein may be made based on the description set forth herein, without departing from the scope and spirit of the invention as set forth in the following claims.

What is claimed is:

1. A method for determining an initial estimate for a reciprocal of a floating point number of a floating point unit of a processor, the method comprising:
   providing the processor with a subtraction circuit;
   subtracting, using the subtraction circuit, the floating point number from a predetermined number to provide a result; and
   using the result as the initial estimate for the reciprocal of the floating point number for use by the floating point unit when performing a floating point operation.

2. The method of claim 1 wherein the predetermined number is a constant, independent of the value of the floating point number.

3. The method of claim 2 further comprising performing a masking operation on at least one least significant bit of the initial estimate to thereby generate a staircase initial estimate.

4. The method of claim 2, wherein the floating point number has a fraction f, and an exponent E, and wherein the initial estimate has an approximate value of $(1-f/2) \times 2^{-E}$.

5. The method of claim 2 wherein the floating point number has a fraction f and an exponent E and wherein the initial estimate has an approximate value of $((1-f/2-c) \times 2^{-E})$, where c is a correction factor, and where 1.f is a significand of the floating point number.

6. The method of claim 5, wherein the correction factor is determined according to a maximum error between $(1-f/2)$ and an actual reciprocal value of the significand of the floating point number.

7. The method of claim 6 wherein the maximum error is a maximum absolute error.

8. The method of claim 7 wherein the correction factor ranges from between 0 and the maximum absolute error.

9. The method of claim 7 wherein the correction factor equals one half the maximum absolute error.

10. The method of claim 5 wherein the correction factor is determined according to a relative error between $(1-f/2)$ and an actual reciprocal value of the significand of the floating point number.

11. The method of claim 10 wherein the correction factor ranges between 0 and a maximum absolute error, the maximum absolute error being a maximum difference between $(1-f/2)$ and the actual reciprocal value of the significand of the floating point number.

12. The method of claim 11 wherein the correction factor is one of $33/56$ of the maximum absolute error, $4/7$ of the maximum absolute error, and $3/5$ of the maximum absolute error.

13. A method of determining an initial estimate for a reciprocal of a floating point number $x_0$ of a floating point unit of a processor, the floating point number having a fraction f, and an exponent E, the floating point number being in the form of 1.f, where f includes bit positions $f_0 f_1 f_2 \ldots f_n$, where $f_1=0$ or 1, and where m is a constant, comprising:

bit complementing the most significant m+1 bits ($f_0 \ldots f_m$), $1 \leq m \leq n$, of the fraction of the floating point number such that the fraction equals $\overline{f_0} \ldots \overline{f_m}$;

negating the exponent E and subtracting 1, to provide the initial estimate with an initial estimate exponent having a value of $-E-1$;

and providing the initial estimate as $1.\overline{f_0}\overline{f_1}\overline{f_2} \ldots \overline{f_m} 2^{-E-1}$ for use by the floating point unit of the processor when performing a floating point operation.

14. The method of claim 13 wherein the initial estimate is provided in a single execution cycle.

15. A method of determining an initial estimate for a reciprocal of a floating point number of a floating point unit of a processor, the floating point number having a fraction, f, a sign and an exponent E, the floating point number being in the form of $1.f_0 f_1 f_2 \ldots f_n \times 2^E$, where $f_i=0$ or 1, $i=0$ to n, 1.f being a significand of the floating point number, and where m is a constant the method comprising:

bit complementing the most significant m bits ($f_0 \ldots f_m$), $1 \leq m \leq n$, of the fraction of the floating point number to provide $\overline{f_0} \ldots \overline{f_m}$;

subtracting h, where h is a correction factor, to provide the initial estimate with a fractional part having a value of $1.\overline{f_0} \ldots \overline{f_m}$ minus the correction factor;

negating the exponent E and subtracting 1, to provide the initial estimate with an initial estimate exponent having a value of $-E-1$; and providing the initial estimate as $(1.\overline{f_0}\overline{f_1}\overline{f_2} \ldots \overline{f_m} -$ the correction factor$) \times 2^{-E-1}$ for use by the floating point unit of the processor when performing a floating point operation.

16. The method as recited in claim 15 wherein the initial estimate is provided in a single execution cycle.

17. A method as recited in claim 15 wherein the correction factor has a value between 0 and twice an approximate maximum absolute error, the approximate maximum absolute error being an approximate maximum difference between $1.\overline{f_0}.\overline{f_1}.\overline{f_2} \ldots \overline{f_n}$ and an actual reciprocal value of the significand of the floating point number.

18. A method as recited in claim 17 wherein the correction factor is twice one of one half the approximate maximum difference, $33/56$ of the approximate maximum difference, $4/7$ of the approximate maximum difference, and $3/5$ of the approximate maximum difference.

19. An apparatus for determining an initial estimate of a reciprocal of a floating point number in a single execution cycle, the floating point number $x_0$ being represented in the form of $1.f \times 2^E$ where $f=f_0 f_1 f_2, \ldots f_n$, $i=0$ to n, each $f_i$ representing a binary digit, 1.f being a significand, and E being an exponent, the apparatus comprising:

a first storage location for containing the floating point number;

a second storage location storing a constant; and an adder coupled to the first and second storage locations, the adder providing an output of the constant minus the floating point number, the output being the initial estimate of the reciprocal of the floating point number.

20. The apparatus as recited in claim 19 wherein the constant has a predetermined value.

21. The apparatus as recited in claim 20 wherein the predetermined value is determined such that subtracting the floating point number from the constant results in an initial estimate having an approximate value of $(1-f/2-c) \times 2^{-E}$, c being a number between 0 and a maximum difference between an actual reciprocal value of the significand of the floating point number and $(1-f/2)$.

22. The apparatus of claim 21, wherein the correction factor is determined according to a maximum error between $(1-f/2)$ and the actual reciprocal value of the significand of the floating point number.

23. The apparatus of claim 22 wherein the maximum error is a maximum absolute error.

24. The apparatus of claim 23 wherein the correction factor ranges from between 0 and the maximum absolute error.

25. The apparatus of claim 23 wherein the correction factor equals one half the maximum absolute error.

26. The apparatus of claim 22 wherein the correction factor is determined according to a relative error between $(1-f/2)$ and the actual reciprocal value of the significand of the floating point number.

27. The apparatus of claim 26 wherein the correction factor ranges between 0 and a maximum absolute error, the maximum absolute error being the maximum difference between $(1-f/2)$ and the actual reciprocal value of the significand of the floating point number.

28. The apparatus of claim 27 wherein the correction factor is one of $33/56$ of the maximum absolute error, $4/7$ of the maximum absolute error, and $3/5$ of the maximum absolute error.

29. The apparatus as recited in claim 21 further comprising a mask circuit coupled to the adder, the mask circuit masking out a predetermined number of the LSBs of the initial estimate, thereby generating a staircase function.

30. An apparatus for determining an initial estimate for a reciprocal of a floating point number, the floating point number having a fraction, f, a sign and an exponent E, the floating point number being in the form of $1.f_0 f_1 f_2 \ldots f_n \times 2^E$, where $f_i=0$ or 1, comprising:

means for storing the floating point number and a predetermined constant; and means for subtracting the floating point number from the predetermined constant to provide $(1.\overline{f_0}\overline{f_1}\overline{f_2} \ldots \overline{f_m}-h) \times 2^{-E-1}$, where h is a correction factor, as the initial estimate of the reciprocal of the floating point number.

31. A method for determining an initial estimate for a reciprocal of a floating point number of a floating point unit in a processor, the floating point number having a fraction f and an exponent E, the method comprising:

storing a number of predetermined constants;

selecting one of the predetermined constants according to predetermined bits of the fraction;

providing the processor with a subtraction circuit; and subtracting, using the subtraction circuit, the floating point number from the selected one of the predetermined numbers to generate the initial estimate for the reciprocal of the floating point number for use by the floating point unit of the processor when performing a floating point operation.

32. The method as recited in claim 31 wherein the predetermined constants are four and the predetermined bits of the fraction are the two most significant bits.

33. An apparatus for determining an initial estimate for a reciprocal of a floating point number, the floating point number having a fraction f and an exponent E, the apparatus comprising:

means for storing a number of predetermined constants;

means for selecting one of the predetermined constants according to predetermined bits of the fraction; and means for subtracting the floating point number from the selected one of the predetermined numbers to generate the initial estimate for the reciprocal of the floating point number.

34. An apparatus as recited in claim 33 wherein the predetermined number of constants is four and the predetermined bits of the fraction are the two most significant bits.

* * * * *